United States Patent [19]

Murata et al.

[11] Patent Number: 5,378,543

[45] Date of Patent: Jan. 3, 1995

[54] THERMOPLASTIC ELASTOMER LAMINATES AND GLASS RUN CHANNELS MOLDED THEREFROM

[75] Inventors: Kazuhiko Murata; Norishige Murakami, both of Ichihara; Kyooji Muraoka, Waki; Noboru Sakamaki, Ichihara, all of Japan

[73] Assignee: Mitsui Petrochemical Industries, Ltd., Tokyo, Japan

[21] Appl. No.: 165,646

[22] Filed: Dec. 13, 1993

Related U.S. Application Data

[62] Division of Ser. No. 872,158, Apr. 22, 1992, Pat. No. 5,302,463.

[30] Foreign Application Priority Data

| | | | |
|---|---|---|---|
| Apr. 22, 1991 | [JP] | Japan | 3-90666 |
| Apr. 22, 1991 | [JP] | Japan | 3-90667 |
| Apr. 22, 1991 | [JP] | Japan | 3-90668 |
| Apr. 26, 1991 | [JP] | Japan | 3-97636 |
| May 10, 1991 | [JP] | Japan | 3-105918 |
| May 10, 1991 | [JP] | Japan | 3-105919 |
| May 10, 1991 | [JP] | Japan | 3-105920 |

[51] Int. Cl.[6] ............................................ B32B 27/08
[52] U.S. Cl. ............................ 428/517; 428/516; 428/519
[58] Field of Search ............ 428/517, 519, 516, 122; 524/269

[56] References Cited

U.S. PATENT DOCUMENTS

| | | | |
|---|---|---|---|
| 4,247,652 | 1/1981 | Matsuda et al. | 521/95 |
| 4,894,289 | 1/1990 | Otawa et al. | 428/424.2 |
| 5,191,005 | 3/1993 | Murata et al. | 524/269 |
| 5,302,463 | 4/1994 | Murat et al. | 428/517 |

FOREIGN PATENT DOCUMENTS

| | | |
|---|---|---|
| 0266982 | 11/1988 | European Pat. Off. . |
| 0336780 | 11/1989 | European Pat. Off. . |
| 220849 | 9/1990 | Japan . |

OTHER PUBLICATIONS

Database WPIL Week 4190, Derwent Publ. Ltd., London, GB; AN 90-310067 and JP-A-2220844 (Bridgestone Tire KK) Sep. 1990.
Database WPIL Week 1990, Derwent Publ. Ltd., London, GB; AN 90-143663 and JP-A-2089639 (Toyoda Gosei KK) Mar. 29, 1990.

*Primary Examiner*—Edith Buffalow
*Attorney, Agent, or Firm*—Sherman and Shalloway

[57] ABSTRACT

According to the present invention, there is provided a thermoplastic elastomer laminate which comprises
a layer comprising a thermoplastic elastomer (A) composed of a crystalline polyolefin and a rubber, and
a layer comprising an ultra-high molecular weight polyolefin (B) or an ultra-high molecular weight polyolefin composition.

In addition, a glass run channel composed of the thermoplastic elastomer laminate is also provided in the invention.

8 Claims, 2 Drawing Sheets

THERMOPLASTIC ELASTOMER LAMINATES AND GLASS RUN CHANNELS MOLDED THEREFROM

This is a division of application Ser. No. 07/872,158 filed Apr. 22, 1992 now U.S. Pat. No. 5,302,463.

FIELD OF THE INVENTION

This invention relates to thermoplastic elastomer laminates effectively useful in preparing interior automotive trims and sealing materials, and to glass run channels molded from said laminates, and more particularly to thermoplastic elastomer laminates consisting of a base layer made of thermoplastic elastomer and a surface layer made of lubricant resin, and to glass run channels having a window glass sliding portion composed of said laminates.

BACKGROUND OF THE INVENTION

Various laminates have heretofore been used for preparing interior automotive trims, sealing materials or the like. For Example, glass run channel is known as one of important sealing materials used in automobile. This glass run channel is a guide member provided between a window glass and a window frame in order to make an intimate (liquid tight) sealing operation between the window glass and the window frame possible while facilitating the ascent-decent and open-shut operations of the window glass.

Materials used conventionally for preparing glass run channels include (1) a composite material comprising vulcanized rubber consisting essentially of an ethylene/propylene/diene copolymer rubber excellent in weathering resistance and heat resistance, an adhesive and nylon fiber, (2) a composite material comprising the above-mentioned vulcanized rubber and an adhesive, and (3) a non-rigid PVC for use in contour extrusion.

The conventional glass run channels composed of such composite materials as mentioned above comprise a main body having a groove-like cross-section and tongue-like draining portions, each extending from the tip of the side wall of groove toward the central side of the groove.

In the conventional glass run channels, a nylon film or the like is laminated with an adhesive to the surface of the window glass sliding portion of each draining portion in order that the window glass may part favorably from said sliding portion and also may be prevented from staining, or the surface of each sliding portions of the draining portions is subjected, before or after the above-mentioned lamination of the nylon film or the like, to embossment treatment in order to lessen the contact area of said sliding portions with the window glass.

In a process of preparing such glass run channels as mentioned above, however, there are involved such inconveniences as large number of steps and time-consuming jobs, wherein because of no adhesive properties existing between the above-mentioned non-rigid synthetic resin or vulcanized rubber and such surface material as nylon, it becomes necessary to take the steps of coating the surface of the window glass sliding portions of the main body of glass run channel molded from the above-mentioned non-rigid synthetic resin or vulcanized rubber with an adhesive, and laminating a nylon film or the like to the surface of said window glass sliding portions, arid further to carry out the embossment treatment of the surface of said sliding portion before or after the above-mentioned lamination of the nylon film or the like.

On one hand, when the conventional glass run channels are prepared by contour extrusion molding the above-mentioned composite material (3), i.e. a non-rigid polyvinyl chloride, the production process employed therefor is simplified. However, this composite material is poor in heat resistance and dimensional stability, and is inferior in practical performance to the above-mentioned composite materials (1) and (2).

When the conventional glass run channels molded from the above-mentioned composite materials (1) or (2), there is a durability problem of the channels because the nylon film or the like is laminated by means of an adhesive to the window glass sliding portions of the draining portions, and there is also such a drawback that the thus laminated nylon film is liable to peel off from said window glass sliding portions with time and upon exposure outdoors. Furthermore, the embossed pattern formed on the surface of the window glass sliding portions by the embossment treatment is not fully satisfactory in point of combination of fineness and uniformity, and there is much room for improvement in intimate contacting properties between the window glass sliding portion and the window glass at the time of shutting the window glass and also in light sliding properties between the window glass sliding portions and the window glass at the time of opening the window glass.

Accordingly, there has been desired the advent of laminates which are excellent in weathering resistance, heat resistance and dimensional stability, can be prepared by a simplified production process and can be used for the purposes such as interior automotive trims, sealing materials or the like, and also the advent of glass run channels comprising window glass sliding portions molded from said laminates.

OBJECT OF THE INVENTION

The present invention is intended to solve such problems associated with the prior art as mentioned above, and an object of the invention is to provide thermoplastic elastomer laminates excellent in weathering resistance, heat resistance and dimensional stability, which can also be prepared by a simplified production process and are excellent in so-called economical efficiency.

A further object of the invention is to provide glass run channels which are excellent not only in economical efficiency but also in durability, intimate contacting properties with the window glass at the time of shutting the window glass and in easy sliding properties with the window glass at the time of opening the window glass.

SUMMARY OF THE INVENTION

The first thermoplastic elastomer laminates of the present invention comprises a layer comprising a thermoplastic elastomer (A) composed of a crystalline polyolefin and a rubber, and a layer comprising an ultra-high molecular weight polyolefin (B).

The thermoplastic elastomer (A) referred to above preferably includes those obtained by subjecting a mixture comprising 70—10 parts by weight of a crystalline polypropylene (a) and 30—90 parts by weight of rubber (b) which is ethylene/propylene copolymer rubber or an ethylene/propylene/diene copolymer rubber (the sum total of the components (a) and (b) is 100 parts by weight) to dynamic heat treatment in the presence of organic peroxide, said rubber (b) being partially cross-linked.

The ultra-high molecular weight polyolefin (B) referred to above preferably has an intrinsic viscosity [η], as measured in decalin at 135° C., of 10–40 dl/g.

The second thermoplastic elastomer laminates of the invention comprises a layer comprising a thermoplastic elastomer (A) composed of a crystalline polyolefin and rubber and a layer, and a layer comprising an ultra-high molecular weight polyolefin composition (C), said ultra-high molecular weight polyolefin composition consisting essentially of an ultra-high molecular weight polyolefin having an intrinsic viscosity [η], as measured in decalin at 135° C., of 10–40 dl/g, and polyolefin having an intrinsic viscosity [η], as measured in decalin at 135° C., of 0.1–5 dl/g, said ultra-high molecular weight polyolefin existing in a proportion of 15–40% by weight based on 100% by weight of the sum total of the ultra-high molecular weight polyolefin and polyolefin, and said ultra-high molecular weight polyolefin composition (C) having an intrinsic viscosity [η], as measured in decalin at 135° C., of 3.5–8.3 dl/g.

The above-mentioned thermoplastic elastomer (A) is the same as used in the first thermoplastic elastomers of the invention.

The aforesaid ultra-high molecular weight polyolefin composition (C) may contain 1–20% by weight, based on the composition (C), of a liquid or solid lubricant.

The third thermoplastic elastomer laminates of the invention comprises a layer comprising a graft-modified thermoplastic elastomer (GA) and a layer comprising an ultra-high molecular weight polyolefin (B), said graft-modified thermoplastic elastomer (GA) being obtained by dynamic heat treatment and partial cross-linkage of a blend in the presence of an organic peroxide, said blend containing (i) 95—10 parts by weight of a peroxide cross-linking olefin copolymer rubber, (ii) 5–90 parts by weight of a polyolefin (the sum total of the (i) and (ii) components is 100 parts by weight) and (iii) 0.01–10 parts by weight of an α,β-unsaturated carboxylic acid or its derivatives, or an unsaturated epoxy monomer.

The graft-modified thermoplastic elastomer (GA) referred to above preferably includes those further containing (iv) 5–100 parts by weight of a peroxide non-cross linking rubbery substance and/or (v) 3–100 parts by weight of a mineral oil softener based on 100 parts by weight of the sum total of the components (i) and (ii).

In the graft-modified thermoplastic elastomer (GA) mentioned above, it is desirable that the content of the peroxide cross-linking olefin copolymer rubber (i) is 95—60 parts by weight and that of the polyolefin (ii) is 5–40 parts by weight (the sum total of the components (i) and (ii) is 100 parts by weight).

The ultra-high molecular weight polyolefin (B) used herein is the same as used in the first thermoplastic elastomer laminates of the invention.

The fourth thermoplastic elastomer laminates of the invention comprises a layer comprising a graft-modified thermoplastic elastomer (GA) and a layer comprising an ultra-high molecular weight polyolefin composition (C), said graft-modified thermoplastic elastomer (GA) being obtained by dynamic heat treatment and partial cross-linkage of a blend in the presence of an organic peroxide, said blend containing (i) 95—10 parts by weight of a peroxide cross-linking olefin copolymer rubber, (ii) 5–90 parts by weight of a polyolefin (the sum total of the (i) and (ii) components is 100 parts by weight) and (iii) 0.01–10 parts by weight of an α,β-unsaturated carboxylic acid or its derivatives, or an unsaturated epoxy monomer, said ultra-high molecular weight polyolefin composition (C) consisting essentially of an ultra-high molecular weight polyolefin having an intrinsic viscosity [η], as measured in decalin at 135° C., of 10–40 dl/g and a polyolefin having an intrinsic viscosity [η], as measured in decalin at 135° C., of 0.1–5 dl/g, said ultra-high molecular weight polyolefin existing in a proportion of 15–40% by weight based on 100% by weight of the sum total of the ultra-high molecular weight polyolefin and polyolefin, and said ultra-high molecular weight polyolefin composition (C) having an intrinsic viscosity [η], as measured in decalin at 135° C., of 3.5–8.3 dl/g.

The graft-modified thermoplastic elastomer (GA) used herein preferably includes the same as used in the third thermoplastic elastomer laminates of the invention.

In the graft-modified thermoplastic elastomer (GA) mentioned above, it is desirable that said elastomer (GA) contains 95—60 parts by weight of the aforesaid peroxide cross-linking olefin copolymer rubber (i) and 5–40 parts by weight of the aforesaid polyolefin (ii) (the sum total of the components (i) and (ii) is 100 parts by weight).

The ultra-high molecular weight polyolefin composition (C) used herein may contain 1–20% by weight of a liquid or solid lubricant based on the composition (C).

The first glass run channel of the present invention comprises a main body having a groove-like cross-section and tongue-like draining portions extending from the tip of side wall of the groove toward the central side of said groove, portions of said glass run channel to be in contact with the window glass comprising a layer of a thermoplastic elastomer (A) composed of a crystalline polyolefin and a rubber and a layer of an ultra-high molecular weight polyolefin (B), said ultra-high molecular weight polyolefin (B) layer being designed so as to be in contact with the window glass, and said ultra-high molecular weight polyolefin (B) having an intrinsic viscosity [η], as measured in decalin at 135° C., of 10–40 dl/g.

The thermoplastic elastomer (A) used herein preferably includes those as defined in the first thermoplastic elastomer laminates of the present invention.

The second glass run channel of the invention comprises a main body having a groove-like cross-section and tongue-like draining portions, each extending from the tip of side wall of the groove toward the central side of said groove, portions of said glass run channels to be in contact with the window glass comprising a layer of a thermoplastic elastomer (A) composed of a crystalline polyolefin and rubber and a layer of an ultra-high molecular weight polyolefin composition (C), said layer of the ultra-high molecular weight polyolefin composition (C) being designed so as to be in contact with the window glass, said ultra-high molecular weight polyolefin composition (C) consisting essentially of an ultra-high molecular weight polyolefin having an intrinsic viscosity [η], as measured in decalin at 135° C., of 10–40 dl/g and a polyolefin having an intrinsic viscosity [η], as measured in decalin at 135° C., of 0.1–5 dl/g, said ultra-high molecular weight polyolefin existing in a proportion of 15–40% by weight based on 100% by weight of the sum total of the ultra-high molecular weight polyolefin and the polyolefin, and said ultra-high molecular weight polyolefin composition (C) having an intrinsic viscosity [η], as measured in decalin at 135° C., of 3.5-8.3 dl/g.

The thermoplastic elastomer (A) used herein preferably includes those as defined in the first glass run channel of the present invention.

The above-mentioned ultra-high molecular weight polyolefin composition (C) may contain 1-20% by weight, based on the composition (C), of a liquid or solid lubricant.

The third glass run channel of the invention comprises a main body having a groove-like cross-section, and tongue-like draining portions extending from the tip of side wall of the groove toward the central side of said groove, portions of said glass run channel to be in contact with the window glass comprising a layer of a graft-modified thermoplastic elastomer (GA) and a layer of an ultra-high molecular weight polyolefin (B), said layer of the ultra-high molecular weight polyolefin (B) being designed so as to be in contact with the window glass, said graft-modified thermoplastic elastomer (GA) being obtained by dynamic heat treatment and partial cross-linkage of a blend in the presence of organic peroxide, said blend containing (i) 95—10 parts by weight of a peroxide cross-linking olefin copolymer rubber, (ii) 5-90 parts by weight of a polyolefin (the total sum of the components (i) and (ii) is 100 parts by weight), and (iii) 0.01-10 parts by weight of an $\alpha,\beta$-unsaturated carboxylic acid or its derivative, or an unsaturated epoxy monomer, and said ultra-high molecular weight polyolefin (B) having an intrinsic viscosity [η], as measured in decalin at 135° C., of 10-40 dl/g.

The fourth glass run channel of the invention comprises a main body having a groove-like cross-section, and tongue-like draining portions extending from the tip of side wall of the groove toward the central side of said groove, portions of said glass run channel to be in contact with the window glass comprising a layer of a graft-modified thermoplastic elastomer (A) and a layer comprising an ultra-high molecular weight polyolefin composition (C), said layer of the ultra-high molecular weight polyolefin composition (C) being designed so as to be in contact with the window glass, said graft-modified thermoplastic elastomer (GA) being obtained by dynamic heat treatment and partial cross-linkage of a blend in the presence of organic peroxide, said blend containing (i) 95-10 parts by weight of a peroxide cross-linking olefin copolymer rubber, (ii) 5-90 parts by weight of a polyolefin (the sum total of the (i) and (ii) components is 100 parts by weight) and (iii) 0.01-10 parts by weight of an unsaturated carboxylic acid or its derivative, or an unsaturated epoxy monomer, said ultra-high molecular weight polyolefin composition (C) consisting substantially of an ultra-high molecular weight polyolefin having an intrinsic viscosity [η], as measured in decalin at 135° C., of 10-40 dl/g and a polyolefin having an intrinsic viscosity [η], as measured in decalin at 135° C., of 0.1-5 dl/g, said ultra-high molecular weight polyolefin existing in a proportion of 15-40% by weight based on the sum total of the ultra-high molecular weight polyolefin and the polyolefin, and said ultra-high molecular weight polyolefin composition (C) having an intrinsic viscosity [η], as measured in decalin at 135° C., of 3.5-8.3 dl/g.

The ultra-high molecular weight polyolefin composition (C) used herein may contain 1-20% by weight, based on the composition (C), of a liquid or solid lubricant.

DETAILED DESCRIPTION OF THE INVENTION

The thermoplastic elastomer laminates and glass run channels molded from said laminates according to the present invention are illustrated below in detail.

First, the thermoplastic elastomer laminates of the invention are illustrated.

The thermoplastic elastomer laminates of the invention are divided roughly into the following four categories.

The first thermoplastic elastomer laminates of the invention comprise a layer of a specific thermoplastic elastomer (A) and a layer of an ultra-high molecular weight polyolefin (B).

The second thermoplastic elastomer laminates of the invention comprise a layer of a specific thermoplastic elastomer (A) and a layer of a specific ultra-high molecular weight polyolefin composition (C).

The third thermoplastic elastomer laminates of the invention comprise a layer of a specific graft-modified thermoplastic elastomer (GA) and a layer of a specific ultra-high molecular weight polyolefin (B).

The fourth thermoplastic elastomer laminates of the invention comprise a layer of a specific graft-modified thermoplastic elastomer (GA) and a layer of a specific ultra-high molecular weight polyolefin composition (C).

THERMOPLASTIC ELASTOMER (A)

The thermoplastic elastomer (A) used in the first and second thermoplastic elastomer laminates of the invention is composed of a crystalline polyolefin and a rubber.

The crystalline polyolefin used in the invention includes homopolymers or copolymers of $\alpha$-olefin having 2-20 carbon atoms.

Concrete examples of the crystalline polyolefin used herein include such (co)polymers as listed below.

(1) Ethylene homopolymer (a low-pressure polyethylene, a high-pressure polyethylene)
(2) Copolymers of ethylene and not more than 10 mol % of other $\alpha$-olefin or vinyl monomer such as vinyl acetate, ethyl acrylate or the like
(3) Propylene homopolymer
(4) Random copolymers of propylene and not more than 10 mol % of other $\alpha$-olefin
(5) Block copolymers of propylene and not more than 30 mol % of other $\alpha$-olefin
(6) Homopolymer of 1-butene
(7) Random copolymers of 1-butene and not more than 10 mol % of other $\alpha$-olefin
(8) Homopolymer of 4-methyl-1-pentene (9) Random copolymers of 4-methyl-1-pentene and not more than 20 mol % of other α-olefin The other α-olefin used in the copolymers exemplified above includes concretely ethylene, propylene, 1-butene, 4-methyl-1-pentene, 1-hexene, 1-octene, etc.

The rubber used in the invention, though not particularly limited, includes preferably olefin copolymer rubbers.

The olefin copolymer rubbers mentioned above are amorphous, random and elastic copolymers derived from (α-olefins, having 2–20 carbon atoms, including amorphous (α-olefin copolymers derived from 2 or more (α-olefins, and (α-olefin/non-conjugated diene copolymers derived from 2 or more (α-olefins and non-conjugated diene.

Concrete examples of such olefin copolymer rubbers as used herein include rubbers as listed below.

(1) Ethylene/α-olefin copolymer rubber [ethylene/α-olefin (molar ratio)=about 90/10—50/50]
(2) Ethylene/α-olefin/non-conjugated diene copolymer rubber [ethylene/α-olefin (molar ratio)=about 90/10—50/50]
(3) Propylene/α-olefin copolymer rubber [propylene/α-olefin (molar ratio)=about 90/10—50/50]
(4) Butene/α-olefin copolymer rubber [Butene/α-olefin (molar ratio)=about 90/10—50/50]

The above-mentioned α-olefin used in these copolymer rubbers includes the same examples of α-olefins as used in constituting the aforesaid crystalline polyolefin to be contained in the thermoplastic elastomer (A).

The non-conjugated diene used in the above-mentioned copolymer rubbers includes concretely dicyclopentadiene, 1,4-hexadiene, cyclooctadiene, methylene norbornene, ethylidene norbornene, etc.

The copolymer rubbers exemplified above preferably have a Mooney viscosity $ML_{1+4}$ (100° C.) of 10–250, especially 40–150, and preferably have an iodine value of not more than 25 when they are copolymerized with the non-conjugated diene.

In the thermoplastic elastomers of the present invention, the above-mentioned olefin copolymer rubber preferably exists in a partially cross-linked state, though said copolymer rubber may be present in noncross-linked state, partially cross-linked state and wholly cross-linked state.

Besides the above-mentioned olefin copolymer rubbers, other rubbers useful in the present invention include, for example, diene rubber such as styrene-butadiene rubber (SBR), nitrile rubber (NBR), natural rubber (NR), butyl rubber (IIR), SEBS, polyisoprene or the like.

In the thermoplastic elastomers used in the invention, the crystalline polyolefin/rubber weight ratio is 90/10 to 10/90, preferably 70/30 to 10/90.

When a combination of the olefin copolymer rubber and other rubber is used as the rubber in the present invention, the other rubber is used in a proportion, based on 100 parts by weight of the sum total of the crystalline polyolefin and the rubber, of not more than 40 parts by weight, preferably 5–20 parts by weight.

The thermoplastic elastomers preferably used in the present invention comprise the crystalline polypropylene and an ethylene/α-olefin copolymer rubber or ethylene/α-olefin/non-conjugated diene copolymer rubber, wherein the crystalline polypropylene and the copolymer rubber are present in a state of being partially cross-linked, and the crystalline polypropylene/rubber weight ratio is 70/30 to 10/90.

The above-mentioned thermoplastic elastomers may be incorporated, if necessary, with such additives as mineral oil softeners, heat stabilizers, antistatic agents, weathering stabilizers, age resistors, fillers, colorants and lubricants.

More concrete examples of the thermoplastic elastomers preferably used in the invention are those obtained by dynamic heat treatment of a mixture (blend) in the presence of organic peroxide, said mixture comprising 60—10 parts by weight of a crystalline polypropylene (a), 40–90 parts by weight of rubber (b) selected from an ethylene/propylene copolymer rubber or an ethylene/propylene/diene copolymer rubber (the sum total of the components (a) and (b) is 100 parts by weight) and 5–100 parts by weight of rubber (c) other than the rubber (b) and/or a mineral oil softener (d), and said rubber (b) being partially cross-linked.

The organic peroxide used in the dynamic heat treatment above includes concretely dicumyl peroxide, di-tert-butyl peroxide, 2,5-dimethyl-2,5-di-(tert-butylpropoxy)hexane, 2,5-dimethyl-2,5-di(tert-butylperoxy)-hexine-3, 1,3-bis(tert-butylproxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxy benzoate, tert-butyl perbenzoate, tert-butylperoxyisopropyl carbonate, diacetyl peroxide, lauroyl peroxide, tertbutylcumyl peroxide, etc.

Of these peroxides exemplified above, preferred from the standpoint of odor and scorch stability are 2,5-dimethyl-2,5-di-(tert-butylperoxy)hexane, hexane, 2,5-dimethyl-2,5-di-(tert-butylperoxy)hexine-3, 1,3-bis(tert-butylperoxyisopropyl) benzene, 1,1-bis(tert-butylperoxy)-3,3,5-trimethylcyclohexane and n-butyl-4,4-bis(tert-butylperoxy)valerate, and the most preferred is 1,3-bis(-tert-butylperoxyisopropyl)benzene.

In the invention, the organic peroxide is used in a proportion, based on 100% by weight of the sum total of the crystalline polyolefin and rubber, of 0.05–3% by weight, preferably 0.1–1% by weight.

In practicing the partial cross-linking treatment with the above-mentioned organic peroxide in accordance with the invention, there can be used such peroxy linkage assistants as sulfur, p-quinone dioxime, p,p'-dibenzoylquinone dioxime, N-methyl-N-4-dinitrosoaniline, nitrosobenzene, diphenyl guanidine, and trimethylolpropane-N,N'-m-phenylene dimaleimide, or divinyl benzene, triallyl cyanurate, or such polyfunctional methacrylate monomers as ethylene glycol dimethacrylate, diethylene glycol dimethacrylate, polyethylene glycol dimethacrylate, trimethylolpropane trimethacrylate and allyl methacrylate, and functional vinyl monomers such as vinyl butylate and vinyl stearate.

By virtue of the use of the above-exemplified compounds in the above-mentioned partial cross-linking treatment, a uniform and mild cross-linking reaction can be expected. It is most preferable in the invention to use particularly divinyl benzene. The preferred divinyl benzene is easy to handle, has good compatibility with the crystalline polyolefin and rubber which are main components of the material to be treated for cross linkage and acts as a dispersant for the organic peroxide, keeping the cross-linking effect by the heat treatment uniform, whereby there is obtained a thermoplastic elastomer well balanced between flowability and physical properties. The cross-linking assistants or polyfunctional vinyl monomers mentioned above are used preferably in a proportion of 0.1-2% by weight, especially 0.3-1% by weight. If the amount of the cross-linking assistant or polyfunctional vinyl monomer used exceeds 2% by weight, the cross-linking reaction proceeds excessively fast when the amount of the organic peroxide used is large and the resulting thermoplastic elastomer is found to be poor in flowability and, on the other hand, when the amount of the organic peroxide is small, the cross-linking assistant or polyfunctional vinyl monomer remains as unaltered monomer in the resulting thermoplastic elastomer, and the thermoplastic elastomer obtained sometimes undergoes change in physical properties by heat history at the time of fabrication thereof. The cross-linking assistants and polyfunctional vinyl monomers should not be used in excess.

By "dynamic heat treatment" as used herein is meant that the above-mentioned components are kneaded together in a molten state.

Kneading devices used for the dynamic heat treatment may be those known ones, for example, open type mixing roll, closed type Banbury mixer, extruder, kneader and continuous mixer. Of these kneading devices, those of closed type are preferred, and kneading is preferably carried out in an atmosphere of inert gas such as nitrogen gas or carbonic acid gas.

Furthermore, the kneading is desirably effected at a temperature at which a half-life period of the organic peroxide used becomes less than 1 minute. The kneading temperature employed is usually 150°-280° C., preferably 170°-240° C., and the kneading time employed is 1-20 minutes, preferably 3-10 minutes. The shear strength to be applied is selected from among $10-10^4$ $sec^{-1}$, preferably $10^2-10^3$ $sec^{-1}$.

The thermoplastic elastomers preferably used in the invention are partially cross-linked. The expression "partially cross-linked" as used herein is intended to designate the case wherein the thermoplastic elastomer has the gel content of 20-98% as measured by the following method, and in the invention preferred thermoplastic elastomers are those having the gel content of 45-98%.

DETERMINATION OF GEL CONTENT

About 100 mg of pellets of the thermoplastic elastomer as a sample is weighed into a closed container and immersed for 48 hours at 23° C. in 30 ml of cyclohexane which is a sufficient amount for the pellets.

Subsequently, the sample is taken out of the container and placed on a filter paper to dry at room temperature for at least 72 hours until a constant weight is reached. The gel content of the sample is represented by the following equation.

Gel content %=(dry weight after cyclohexane immersion)/(weight before cyclohexane immersion)×100

The thermoplastic elastomer (A) from which one layer of the first and second thermoplastic elastomer laminates of the invention is composed is excellent in flowability, because it comprises a crystalline polyolefin and rubber.

GRAFT-MODIFIED THERMOPLASTIC ELASTOMER (GA)

The graft-modified thermoplastic elastomer (GA) used in the third and fourth thermoplastic elastomer laminates of the invention includes those obtained by dynamic heat treatment and partial crosslinkage of a blend in the presence of organic peroxide, said blend comprising (a) a peroxide crosslinking olefin copolymer rubber, (b) a polyolefin, and (c) $\alpha,\beta$-unsaturated carboxylic acid or its derivative, or an unsaturated epoxy monomer.

The above-mentioned blend herein used may contain (d) a peroxide non-crosslinking rubbery substance and (e) a mineral oil softener.

The peroxide crosslinking olefin copolymer rubber (a) used in the above-mentioned blend is an amorphous elastic copolymer derived from olefins, for example, such as an ethylene/propylene/non-conjugated diene copolymer rubber or an ethylene/butadiene copolymer rubber, which decreases in flowability or will not flow when crosslinked by kneading in admixture with organic peroxide under application of heat.

The non-conjugated diene contained in the ethylene/propylene/non-conjugated diene copolymer rubber mentioned above includes concretely dicyclopentadiene, 1,4-hexadiene, dicyclooctadiene, methylene-norbornene, ethylidene-norbornene, etc.

Of the peroxide crosslinking olefin copolymer rubber (a) mentioned above, preferably used in the invention are an ethylene/propylene copolymer rubber or an ethylene/propylene/non-conjugated diene rubber having the ethylene component unit/propylene component unit molar ratio of 50/50 to 90/10, particularly 55/45 to 85/15. Of these copolymer rubbers, an ethylene/propylene/non-conjugated diene copolymer rubber, particularly an ethylene/propylene/ethylidene-norbornene copolymer rubber are preferred, because they are capable of giving thermoplastic elastomers excellent in heat resistant, tensile strength characteristics and impact resilience.

The peroxide crosslinking olefin copolymer rubbers preferably have a Mooney viscosity $ML_{1+4}$ (100° C.) of 10-250, especially 40-250. When the peroxide crosslinking olefin copolymer rubber having a Mooney viscosity $ML_{1+4}$ (100° C.) of less than 10 is used, the resulting thermoplastic elastomer composition tends to decrease in tensile strength characteristics. On the other hand, when the peroxide crosslinking olefin copolymer rubber having a Mooney viscosity $ML_{1+4}$ (100° C.) exceeding 250 is used, the resulting thermoplastic elastomer composition tends to decrease in flowability.

The peroxide crosslinking olefin copolymer rubbers desirably have an iodine value of not more than 25. When the peroxide crosslinking olefin copolymer rubber having the iodine value as defined above is used, the resulting thermoplastic elastomer is well balanced between flowability and rubber properties.

The peroxide crosslinking olefin copolymer rubber (a) is used in a proportion of 95—10 parts by weight, preferably 95—60 parts by weight based on 100 parts by weight of the total sum of the peroxide crosslinking olefin copolymer rubber (a) and the polyolefin (b).

When the peroxide crosslinking olefin copolymer rubber (a) is used in the proportion as defined above, the resulting graft-modified thermoplastic elastomer (GA) is excellent in moldability as well as in rubber characteristics such as rubber resilience.

The polyolefin (b) used in the invention is composed of a crystalline high molecular weight product obtained by high-pressure or low-pressure polymerization of at least one monoolefin. Examples of such resin as mentioned above include isotactic or sydiotactic monoolefin polymer resins. Representatives of these resins are commercially available.

Concrete examples of appropriate starting olefins include ethylene, propylene, 1-butene, 1-pentene, 1-hexene, 2-methyl-1-propene, 3-methyl-1-pentene, 4-methyl-1-pentene, 5-methyl-1-hexene, 1-octene, 1-decene, and mixed olefin containing two or more olefins mentioned above. In the invention, these starting olefins may be either homopolymerized or copolymerized irrespective of polymerization techniques, so long as resinous product is obtained thereby.

Most preferred polyolefins are peroxide decomposing type polyolefins.

By peroxide decomposing type polyolefins as used herein are meant polyolefins which thermally decompose when mixed with peroxide and kneaded under application of heat, thereby decreasing in molecular weight and increasing in flowability of the resulting resin. Such polyolefins include, for example, isotactic polypropylene, copolymers of propylene and small amounts of other α-olefin, for example, propylene/ethylene copolymer, propylene/1-butene copolymer, propylene/1-hexene copolymer, propylene/4-methyl-1-pentene copolymer, etc.

The polyolefins used in the invention desirably have a melt index (ASTM-D1239-65T, 23° C.) of 0.1–50, especially 5–20.

The use of the polyolefins contribute toward improvement in flowability as well as in heat resistance of the elastomer composition.

The polyolefin (b) is used in a proportion of 5–90 parts by weight, preferably 5–40 parts by weight based on 100 parts by weight of the sum total of the peroxide crosslinking copolymer rubber (a) and the polyolefin (b).

When the polyolefin (b) is used in the proportion as defined above, the resulting graft-modified thermoplastic elastomer (GA) is excellent in rubber characteristics such as rubber resilience and, moreover, in flowability, as a consequence of the foregoing said elastomer (GA) is found to be excellent in moldability.

The aforesaid α,β-unsaturated carboxylic acid or its derivative, or an unsaturated epoxy monomer (c) is used as a graft modifier.

The above-mentioned α,β-unsaturated carboxylic acid or its derivative includes concretely unsaturated carboxylic acids such as acrylic acid, methacrylic acid, maleic acid, fumaric acid, itaconic acid, citraconic acid, tetrahydrophthalic acid and bicyclo-[2,2,1]hept-2-ene-5,6-dicarboxylic acid; anhydrides of unsaturated carboxylic acid such as maleic anhydride, itaconic anhydride, citraconic anhydride, tetrahydrophthalic anhydride, and anhydride of bicyclo[2.2.1]hept-2-ene-5,6-dicarboxylic acid; and esters of unsaturated carboxylic acids such as methyl acrylate, methyl methacrylate, dimethyl maleate, monomethyl maleate, diethyl fumarate, dimethyl itaconate, diethyl citraconate, dimethyl anhydrous tetrahydrophthalate and dimethyl bicyclo[2.2.1]hept-2-ene-5,6-dicarboxylate. Of these compounds exemplified above, preferred are maleic acid, bicyclo[2.2.1]hept-2-ene5,6-dicarboxylic acid or anhydride thereof.

The above-mentioned unsaturated epoxy monomer includes concretely glycidyl ester of unsaturated monocarboxylic acid, such as glycidyl acrylate, glycidyl methacrylate or glycidyl p-sterarylcarboxylate; monoglycidyl ester or polyglycidyl ester of such unsaturated carboxylic acid as maleic acid, iraconic acid, citraconic acid, butenetricarboxylic acid, endo-cis-bicylco[2.2.1]hept-5-ene-2,3-dicarboxylic acid, or endo-cis-bicyclo[2.2.1]-hept-ene-2-methyl-2,3-dicarboxylic acid; unsaturated glycidyl ether such as allyl glycidyl ether, 2-methylallyl glycidyl ether, glycidyl ether of o-allylphenol, glycidyl ether of m-allylphenol, glycidyl ether of p-allylphenol, glycidyl ether of isopropenyl phenol, glycidyl ether of m-biphenol or glycidyl ether of p-biphenol; 2-(o-vinylphenyl) ethylene oxide, 2-(p-vinylphenyl)ethylene oxide, 2-(o-vinylphenyl) propylene oxide, 2-(p-vinylphenyl)propylene oxide, 2-(o-allylphenyl) ethylene oxide, 2-(p-allylphenyl)ethylene oxide, 2-(o-allylphenyl)propylene oxide, 2-(p-allylphenyl)propylene oxide, p-glycidyl styrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene monoxide or allyl-2,3-epoxycyclopentyl ether.

The above-mentioned α,β-unsaturated carboxylic acid or its derivative, or an unsaturated epoxy monomer (c) is used in a proportion of 0.01–10 parts by weight, preferably 0.1–5 parts by weight based on 100 parts by weight of the sum total of the peroxide crosslinking olefin copolymer rubber (a) and the polyolefin (c).

When the above-mentioned, α,β-unsaturated carboxylic acid or its derivative or unsaturated epoxy monomer (c) is used in the proportion defined above, the resulting graft-modified thermoplastic elastomer (GA) is excellent in moldability and, moreover, excellent in its adhesion to the ultra-high molecular weight polyolefin layer (B) or the ultra-high molecular weight polyolefin composition layer (C).

The peroxide non-crosslinking rubbery substance (d) used in the invention is intended to designate a hydrocarbon rubbery substance which does not cross-link and does not decrease in flowability even when mixed with peroxide and kneaded under application of heat in the same manner as, for example, in polyisobutylene, butyl rubber, propylene/ethylene copolymer rubber having the propylene content of at least 70 mol % or a tactic polypropylene. Of these, particularly preferred is polyisobutylene since polyisobutylene is excellent in properties and easy to handle.

The above-mentioned peroxide non-crosslinking rubber substance (d) contributes toward the improvement in flowability of the elastomer composition, and particularly preferred are those having a Mooney viscosity 1+4 (100° C.) of not more than 60.

In the invention, the peroxide non-crosslinking rubbery substance (d) is used in a proportion of 5–100 parts, particularly 5–50 parts by weight based on 100 parts by weight of the sum total of the peroxide crosslinking olefin copolymer rubber (a) and the polyolefin (b).

The mineral oil softener (e) used in the invention is a high boiling petroleum fraction which is usually used for purposes of facilitating the roll processing of rubber by weakening intermolecular force of rubber, of helping dispersion of the filler such as carbon black or white carbon or of increasing flexibility or resilience of vulcanized rubber by decreasing said vulcanized rubber in hardness. The mineral oil softener (C) is usually classified as paraffinic, naphthenic and aromatic softeners.

The mineral oil softener (e) is used in a proportion of 3–100 parts by weight, preferably 5–80 parts by weight based on 100 parts by weight of the sum total of the peroxide-crosslinking olefin copolymer rubber (a) and the polyolefin (b).

The graft-modified thermoplastic elastomer (GA) used in the invention is prepared by a process which comprises subjecting a blend to dynamic heat treatment in the presence of organic peroxide and thereby to effect partial crosslinkage, said blend being obtained by mixing together the peroxide-crosslinking olefin copolymer rubber (a), polyolefin (b) and $\alpha,\beta$-unsaturated carboxylic acid or its derivative or unsaturated epoxy monomer (c) and, if necessary, the peroxide non-crosslinking rubbery substance (d) and mineral oil softener (e) in the proportions as defined above.

It is preferable to use the above-mentioned peroxide non-crosslinking rubbery substance (d) and mineral oil softener (e).

The graft-modified thermoplastic elastomer (GA) used in the invention may be incorporated with fillers and colorants to such an extent that no objects of the invention are missed.

The fillers used herein include concretely calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdeum bisulfide, graphite, glass fiber, glass bead, pumice balloon, carbon fiber, etc.

The colorants used herein include concretely carbon black, titanium oxide, zinc white, iron oxide red, ultramarine blue, Prussian blue, azo pigment, nitroso pigment, lake pigment, phthalocyanine pigment, etc.

The graft-modified thermoplastic elastomer (GA) may further incorporate with known heat stabilizers such as phenol, sulfite, phenylalkane, phosphite and amine stabilizers; age resistors; weathering agents; antistatic agents; and slip agents such as metallic soap and wax in a proportion commonly employed in the preparation of polyolefins or olefin copolymer rubbers.

The graft-modified thermoplastic elastomer (GA) which has been partially cross-linked may be prepared by dynamically heat-treating the blend comprising the above-mentioned components in the presence of organic peroxide.

The term "dynamically heat-treating" is intended to designate that the above-mentioned components are kneaded together in a molten state.

Preferred examples of the organic peroxide used at the time of the preparation of the graft-modified thermoplastic elastomer (GA) are the same as used in the case of the above-mentioned thermoplastic elastomer (A).

The organic peroxide is used in a proportion of 0.05–3% by weight, preferably 0.1–1% by weight based on 100% by weight of the sum total of the peroxide cross-linking olefin copolymer rubber (a), polyolefin (b) and $\alpha,\beta$-unsaturated carboxylic acid or its derivative or unsaturated epoxy monomer (c).

When the organic peroxide is used in the proportion as defined above, the resulting graft-modified thermoplastic elastomer (GA) is excellent in rubber properties such as heat resistance, tensile characteristics, elastic recovery and impact resilience, and strength characteristics and, moreover, excellent in moldability.

Kneading devices and kneading conditions, such as kneading temperature, kneading time and shear force, employed in the preparation of the graft-modified thermoplastic elastomer (GA) are the same as used in the case of the thermoplastic elastomer (A).

Peroxy crosslinking assistants, polyfunctional methacrylate monomers and polyfunctional vinyl monomers which may be used in the above-mentioned partial cross-linking treatment by means of the organic peroxide are the same as those used in the case of thermoplastic elastomer (A).

The effects obtained by the use of the above-mentioned crosslinking assistants and polyfunctional methacrylate monomers are the same as can be expected in the case of the thermoplastic elastomer (A), and the amounts of these compounds used are the same as in the case of the thermoplastic elastomer (A). In connection with the foregoing, the same direction for the use of the crosslinking assistants or polyfunctional vinyl monomers, particularly with respect to amounts of these compounds to be used, as in the case of the thermoplastic elastomer (A) should be kept, as well.

Furthermore, in order to attain accelerated decomposition of the organic peroxide, there may also be used a decomposition of accelerator including tertiary amine such as triethylamine, tributylamine or 2,4,6-tris (dimethylamine)phenol and naphthenate such as aluminum, cobalt, vanadium, copper, calcium, zirconium, manganese, magnesium, lead or mercury naphthenate.

The graft-modified thermoplastic elastomer used in the invention has been partially cross-linked. The expression "partially cross-linked" as used herein is intended to designate that the elastomer has the gel content of 20–98%, preferably 45–98%.

The gel content of the above-mentioned elastomer is obtained by the same method employed in the case of the thermoplastic elastomer (A).

The graft-modified thermoplastic elastomer (GA), from which one of the layers of the third and fourth thermoplastic elastomer laminates of the invention is formed, is excellent in flowability, because the elastomer (GA) is composed of the partially cross-linked olefin copolymer rubber and polyolefin, particularly the peroxide decomposition type polyolefin.

ULTRA-HIGH MOLECULAR WEIGHT POLYOLEFIN (B)

The ultra-high molecular weight polyolefin (B) used in the first and third thermoplastic elastomer laminates of the invention is a lubricating resin which includes, for example, homopolymers or copolymers of $\alpha$-olefins such as ethylene, propylene, 1-butene, 1-pentene, 1-hexene, 1-octene, 1-decene, 1-dodecne, 4-methyl-1-pentene and 3-methyl-1-pentene. Of the polymers mentioned above, preferred in the invention are ethylene hompolymer and copolymers of ethylene as a major component and other $\alpha$-olefins.

Preferably used ultra-high molecular weight polyolefins are those having an intrinsic viscosity [$\eta$], as measured in decalin at 135° C., of 10–40 dl/g, particularly 15–35 dl/g.

The ultra-high molecular weight polyolefin (B) may be incorporated with the same fillers and colorants as used in the aforesaid graft-modified thermoplastic elastomer (GA) in like manner.

Furthermore, the ultra-high molecular weight polyolefin (B) used in the invention may be incorporated with the same additives as used in the aforesaid graft-modified thermoplastic elastomer (GA) in the proportions commonly employed in the preparation of olefin plastics or olefin copolymer rubbers.

ULTRA-HIGH MOLECULAR WEIGHT POLYOLEFIN COMPOSITION (C)

The ultra-high molecular weight polyolefin composition (C) used in the second and fourth thermoplastic elastomer laminates of the invention comprises the ultra-high molecular weight polyolefin having an intrinsic viscosity $[\eta]$, as measured in decalin at 135° C., of 10–40 dl/g and a low molecular weight or high molecular weight polyolefin having an intrinsic viscosity $[\eta]$, as measured in decalin at 135° C., of 0.1–5 dl/g, said ultrahigh molecular weight polyolefin existing in the composition in a proportion of 15–40% by weight based on 100% by weight of the sum total of the ultra-high molecular weight polyolefin and the low molecular or high molecular weight polyolefin, and said composition having an intrinsic viscosity $[\eta]$, as measured in decal in at 135° C. of 3.5–8.3 dl/g.

The ultra-high molecular weight polyolefin, from which this composition (C) is formed, is the above-mentioned ultra-high molecular weight polyolefin (B) having the intrinsic viscosity $[\eta]$ as mentioned above.

The above-mentioned low molecular or high molecular weight polyolefin other than the ultra-high molecular weight polyolefin in the above composition (C) is a homopolymer or a copolymer of $\alpha$-olefin such as ethylene, propylene, 1-butene, 1-pentene, 1-hexene, 1-octene, 1-decene, 1-dodecene, 4-methyl-1-pentene, 3-methyl-1-pentene, etc. In the invention, an ethylene homopolymer and a copolymer consisting essentially of ethylene and other $\alpha$-olefin are desirably used as the low molecular or high molecular weight polyolefin mentioned above.

The ultra-high molecular weight polyolefin composition (C) may contain 1–20% by weight, based on the composition (C), of a liquid or solid lubricant.

The liquid lubricant used in the above composition (C) includes a petroleum lubricating oil and a synthetic lubricating oil.

The petroleum lubricating oil used herein includes concretely liquid paraffin, spindle oil, refrigerator oil, dynamo oil, turbine oil, machine oil, cylinder oil, etc.

The synthetic lubricating oil used herein includes concretely synthetic hydrocarbon oil, polyglycol oil, polyphenyl ether oil, ester oil, phosphate ester oil, polychlorotrifluoroethylene oil, fluoroester oil, chlorinated biphenyl oil, silicone oil, etc.

The solid lubricant used mainly in the above composition (C) includes concretely graphite and molybdenum bisulfide. However, in addition thereto, there may be used boron nitride, tungsten bisulfide, lead oxide, glass powder and metallic soap. The solid lubricant can be used singly or in combination with the liquid lubricating oil, for example, the combined lubricant may be added in the form of sol, gel or suspensoid to the ultra-high molecular weight polyolefin composition.

The above-mentioned ultra-high molecular weight polyolefin composition (C) may be incorporated, if necessary, with additives such as mineral oil softeners, heat stabilizers, antistatic agents, weathering stabilizers, age resistors, fillers, colorants, slip agents, etc. to such an extent that no objects of the invention are missed.

In preparing the thermoplastic elastomer laminates of the invention, the ultra-high molecular weight polyolefin composition (C) can be subjected to co-extrusion laminating treatment with the above-mentioned thermoplastic elastomers [(A) and (GA)], the thermoplastic elastomer layer and the ultra-high molecular weight polyolefin composition layer can be directly laminated together without requiring the film (sheet) molding process, hence this is economical.

On the one hand, the aforesaid ultra-molecular weight polyoolefin (B) having an intrinsic viscosity $[\eta]$, as measured in decalin at 135° C., of 10–40 dl/g, as it is, cannot be laminated directly with the above-mentioned thermoplastic elastomer [(A) and (GA)] by co-extrusion technique. Accordingly, when the thermoplastic elastomer layer is laminated with the ultra-high molecular weight polyolefin layer, at least one of these layers must be formed in advance into a film (or sheet), thus this is inferior in economical efficiency to the case of the above-mentioned ultra-high molecular weight polyolefin composition (C).

THERMOPLASTIC ELASTOMER LAMINATE

The first thermoplastic laminate of the invention is composed of a layer of the above-mentioned thermoplastic elastomer (A) and a layer of the above-mentioned ultra-high molecular weight polyolefin (B).

The first thermoplastic elastomer laminate of the invention may be obtained by laminating the above-mentioned two layers together.

The thermoplastic elastomer (A) layer (herein after abbreviated to (A) layer) may be laminated with the ultra-high molecular weight polyolefin (B) layer (hereinafter abbreviated to (B) layer) by the following method, though varies according to the shape, size and required physical properties of the end product intended and not particularly limited.

(1) A laminating method wherein (A) and (B) layers prepared previously are fusion bonded together by means of a calender roll molding machine or compression molding machine at a temperature higher the temperature at which at least one of the two layers is fused.

(2) A laminating method wherein one of the two (A) and (B) layer is formed in advance into a sheet, and the layer thus formed is then fusion bonded to the other layer under extrusion calender.

In the first thermoplastic laminate of the invention as illustrated above, the layer composed of the above-mentioned thermoplastic elastomer (A) is excellent in heat resistance, heat aging characteristics and rubber resilience, because said elastomer (A) comprises a crystalline polyolefin and a rubber.

In the first thermoplastic elastomer laminate of the invention, the layer composed of the above-mentioned ultra-high molecular weight polyolefin (B) is excellent in abrasion resistance, scratch resistance, sliding properties and chemical resistance.

The second thermoplastic elastomer laminate of the invention is composed of a layer of the above-mentioned thermoplastic elastomer (A) and a layer of the ultra-high molecular weight polyolefin composition (C).

The second thermoplastic elastomer laminate of the invention may be obtained by laminating the above-mentioned two layers together, and a process for obtaining the same is not particularly limited, though it varies according to the shape, size and required physical properties of the final product intended to obtain.

The above-mentioned (A) layer may be laminated to the ultra-high molecular weight polyolefin composition (C) layer by a laminating process similar to that employed in the case of the first thermoplastic elastomer laminate of the invention.

Furthermore, in preparing the second thermoplastic elastomer laminate of the invention, the following laminate method (3) may be employed.

(3) A method wherein (A) layer and (C) layer are co-extruded by means of a multilayer extrusion processing machine to effect the fusion bonding thereof.

In the present invention, a preferred laminating method is the above-mentioned method (3).

In the second thermoplastic elastomer laminate of the invention, the layer comprising the above-mentioned thermoplastic elastomer (A) is excellent in heat resistance, heat aging characteristics and rubber resilience, because said elastomer is composed of a crystalline polyolefin and a rubber.

Furthermore, in the second thermoplastic elastomer laminate of the invention, the layer comprising the above-mentioned ultra-high molecular weight polyolefin composition (C) is excellent in abrasion resistance, scratch resistance, sliding properties and chemical resistance.

The third thermoplastic elastomer laminate of the invention is composed of a layer comprising the above-mentioned graft-modified thermoplastic elastomer (GA) and a layer comprising the ultra-high molecular weight polyolefin (B).

The third thermoplastic elastomer laminate of the invention may be obtained by laminating the above-mentioned two layers together.

In that case, the same laminating methods as in the first thermoplastic elastomer laminate of the invention may be employed therefor.

In the third thermoplastic elastomer laminate of the invention, the layer composed of the above-mentioned graft-modified thermoplastic elastomer (GA) comprising a partially cross-linked olefin copolymer rubber and a polyolefin, preferably a peroxide decomposition type polyolefin.

In the third thermoplastic elastomer laminate of the invention, the layer comprising the above-mentioned ultra-high molecular weight polyolefin (B) is excellent in abrasion resistance, scratch resistance, sliding properties and chemical resistance.

The fourth thermoplastic elastomer laminate of the invention is composed of a layer comprising the above-mentioned graft-modified thermoplastic elastomer (GA) and a layer comprising the ultra-high molecular weight polyolefin composition (C).

The fourth thermoplastic elastomer laminate of the invention may be obtained by laminating the above-mentioned two layers together.

In that case, the same laminating methods as in the second thermoplastic elastomer laminate of the invention may be employed therefor, and preferred is the above-mentioned co-extrusion method (3).

In the fourth thermoplastic elastomer laminate of the invention, the layer composed of the graft-modified thermoplastic elastomer (GA) is excellent in heat resistance, heat aging characteristics and rubber resilience, because said elastomer (GA) comprising a partially cross-linked olefin copolymer rubber and a polyolefin, preferably a peroxide decomposition type polyolefin.

Furthermore, in the fourth thermoplastic elastomer laminate of the invention, the layer comprising the above-mentioned ultra-high molecular weight polyolefin composition (C) is excellent in abrasion resistance, scratch resistance, sliding properties and chemical resistance.

In the first to fourth thermoplastic elastomer laminates of the invention, it is desirable that the thermoplastic elastomer (A) layer and graft-modified thermoplastic elastomer (GA) layer have a thickness of 0.1–50 mm, and the ultra-high molecular weight polyolefin (B) layer and ultra-high molecular weight polyolefin composition (C) layer have a thickness of 5 $\mu$m to 10 mm.

An example of the glass run channels of the present invention is illustrated below in detail with reference to the accompanying drawings.

Figure 1:
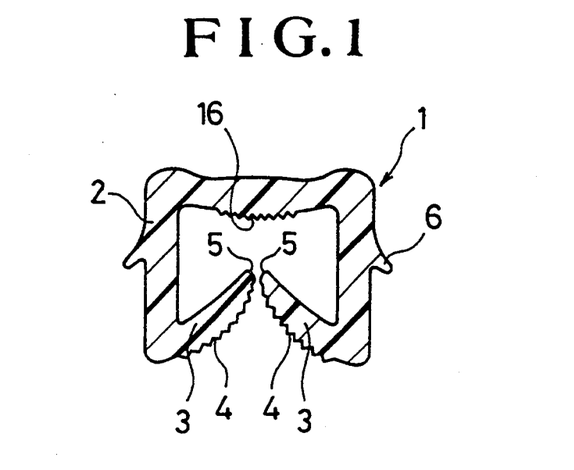
FIG. 1 is a sectional view of a glass run channel of the present invention.

In FIG. 1 showing a sectional structure of an example of the glass run channel of the invention, this glass run channel comprises a main body 2 having a groove-like (U-shaped) cross section and tongue-like draining portions 3 extending from the tip to the side wall of the groove toward the central side of said groove. This pair of the draining portions 3,3 incline to extend inwardly toward the groove of the main body 2, the exterior surface of each draining portion becomes a window contacting portion 4, and points 5,5 of the window glass contacting portions 4 are in such a positioning relationship that they are capable of opening and shutting mutually by themselves. The main body 2 is provided on both side walls thereof with hooks for fitting the main body 2 with a window frame.

The main body 2 and draining portions 3,3 are integrally molded from an elastomer. In accordance with the present invention, at least the window glass containing portions 4,4 are composed of a laminate comprising a substrate layer comprising the aforesaid thermoplastic elastomer (A) or graft-modified thermoplastic elastomer (GA) and a lubricating resin comprising the aforesaid ultra-high molecular weight polyolefin (B) or ultra-high molecular weight polyolefin composition (C), that is, said laminate may be any of the aforesaid first to fourth thermoplastic elastomer laminates of the invention.

Figure 2:
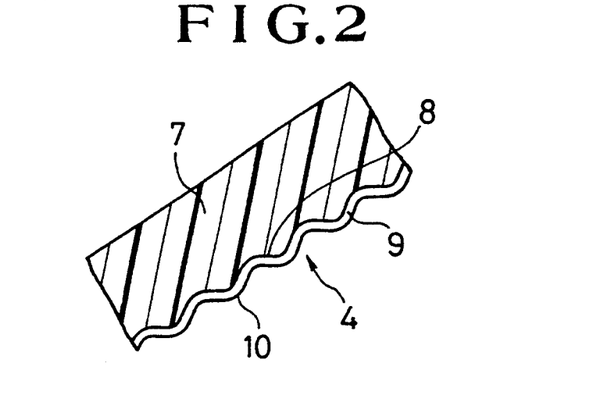
FIG. 2 is an enlarged sectional view of a portion of the glass run channel shown in FIG. 1, with which the window glass comes into contact.

As is clear from FIG. 2 showing an enlarged view of this window glass contacting portion 4, the substrate layer 7 preferably has a rough surface 8. To this shark skin-like surface 8 is laminated by fusion bonding the above-mentioned lubricating resin layer 9 having a surface 10 similar to the surface 8.

Figure 3:
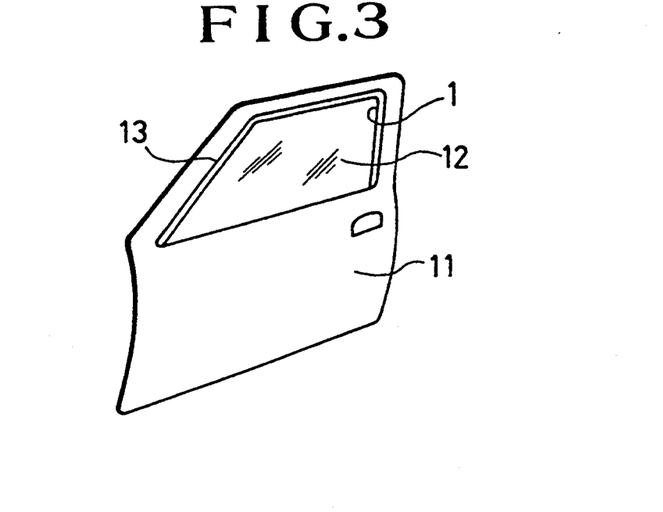
FIG. 3 is a view showing how the glass run channel is fitted to the automobile's door.
Figure 4:
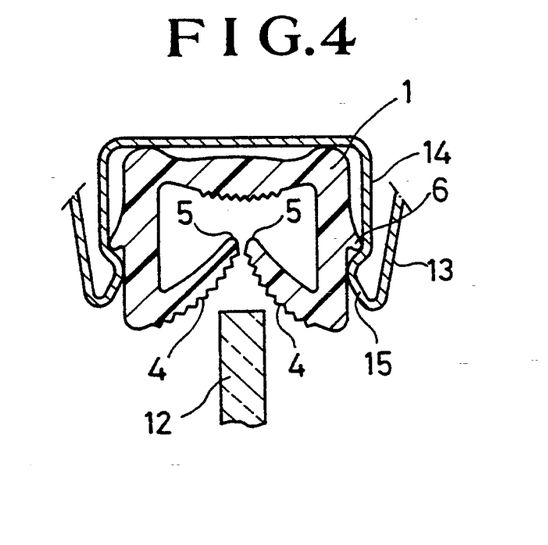
FIG. 4 is a cross-sectional view of the fitted glass run channel showing its state at the time when the window glass is open.
Figure 5:
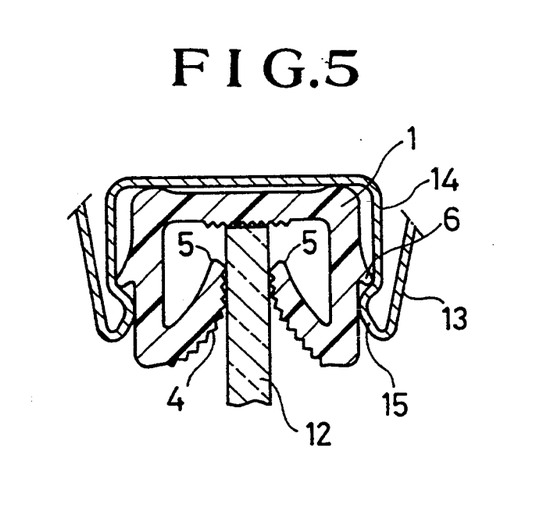
FIG. 5 is a cross-sectional view of the fitted glass run channel showing its state at the time when the window glass is shut.

In FIGS. 3, 4 and 5 illustrating how this glass run channel is fitted to the automotive window, the automotive door is provided with a window glass 12 capable of being opened or shut by means of a vertical motion, and a glass run channel 1 is fastened to a window frame 13. As shown in FIGS. 4 and 5, the window frame 13 is molded so as to have its U-shaped section as a whole, and inwardly projected portions 15 are formed at inlet parts of a concave portion 14 of the window frame 13. Into this concave portion 14 of the window frame 13 is inserted the glass run channel 1 to engage the hooks 6 of said channel 1 with the above-mentioned projected portions 15, thereby fixing the glass run channel 1 to the window frame 13. As shown in FIG. 4, when the window glass 12 is in a fallen state, the points 5,5 of the glass sliding portions 4,4 are close to each other face to face, and as shown in FIG. 5, when the window glass in a state of being elevated, the points 5,5 are separated by the window glass 12 inserted between said points 5,5, though the points 5,5 are in contact with the surfaces of the window glass 12.

In the glass run channel 1 of the invention, at least a portion of said channel with which the window glass is brought into contact has the substrate layer 7 comprising the aforesaid thermoplastic elastomer (A) or graft-modified thermoplastic elastomer (GA), and the lubricating resin layer 9 consisting of the aforesaid ultra-high molecular weight polyolefin (B) or ultra-high molecular weight polyolefin composition (C) fuse-bonded onto the surface of the substrate layer 7.

That is, the above-mentioned thermoplastic elastomers used in the invention are thermoformable into thermoformed articles of any shape and dimension and, at the same time, they are excellent in characteristics required for the window glass sliding portions of the glass run channel such as resilience, flexibility and compressionability and, moreover, excellent in such properties as durability, weathering resistance and water resistance.

Furthermore, the main body 2 and the substrate layer 7 of the draining portion 3 of the glass run channel comprising the above-mentioned thermoplastic elastomer are excellent in heat resistance, tensile characteristics and rubbery properties such as flexibility and impact resilience. Particularly preferred thermoplastic elastomers used herein are the above-mentioned partially cross-linked thermoplastic elastomers and partially cross-linked graft-modified thermoplastic elastomers.

The above-mentioned thermoplastic elastomers may be molded into molded articles by means of conventional molding devices such as those for compression molding, transfer molding, injection molding and extrusion process.

The aforesaid thermoplastic elastomers (A) and graft-modified thermoplastic elastomers (GA) exhibit strong adhesion to the lubricating resin layer 9 comprising the ultra-high molecular weight polyolefin (B) or ultra-high molecular weight polyolefin composition (C), said resin layer 9 forming a surface material layer of the substrate layer 7, and are capable of forming by fusion bonding with this lubricating resin layer 9 laminated structures excellent in interlaminar strength immediately after bonding and after the lapse of time, and excellent in interlaminar strength after weathering test. In the present invention, moreover, the above-mentioned thermoplastic elastomers used for forming the substrate layer 7 can be molded into molded articles having a shark skin-like surface, and by combination use of this molding step with the fusion bonding step between the lubricating resin layer 9 and the substrate layer 7, this shark skin-like surface pattern can be faithfully reproduced on the outer surface of the lubricating resin layer 9. According to the conventional coating process using adhesives as mentioned previously, however, it is extremely difficult to reproduce such a shark skin-like pattern on the outer surface of the lubricating resin layer, and this reproduction can only be attained by the combination use of the above-mentioned molding step and fusion bonding step.

In accordance with the present invention as illustrated hereinbefore, there can be prepared efficiently glass run channels with the processes small in number and saved time and labor, while omitting all the processes required conventionally such as those of coating the adhesive, of curing or baking the coated adhesive and of embossing the desired pattern. Furthermore, it has become possible to reduce the frictional coefficient between the window glass and the glass run channel by providing the lubricating resin layer 9 comprising the ultra-high molecular weight polyolefin (B) or the like as the surface material layer of the substrate layer 7. In addition thereto, it has become possible to form shark skin-like fine projections uniform in patch on the outer surface of the; lubricating resin layer 9, as compared with the concave and convex pattern obtained by the conventional embossment. Accordingly, in the glass run channels of the invention, the window glass can be brought into contact (liquid tight) with the glass run channel when said window glass is closed and, at the same time, a smooth and light open and close operation of the window glass can be made possible by reduction in slide friction at the time of opening the window glass.

In the glass run channels of the invention, it is desired that the draining portions 3,3 are formed from the same material used for the main body 2.

When the main body 2 consists of such thermoplastic elastomer as mentioned above, the draining portions 3,3 formed from the same material as used in the main body 2 are of practical used in point of durability as well as in point of bonding strength to the lubricating resin layer 9.

Sharkskin (dry or scaly skin)-like pattern useful in the glass run channels of the invention can be exhibited at the time of molding by suitably selecting properties of the starting thermoplastic elastomers.

The exterior appearance of the thus obtained sharkskin differs from melt fracture which may be seen at the time of extrusion molding of resins or elastomers, and the molded article having this sharkskin on its surface is periodically coarse and has minute projections.

Furthermore, it is necessary that the surface of the lubricating resin layer 9 laminated to the surface of the sharkskin pattern also has the same sharkskin pattern exhibited on said surface, and hence the lubricating resin layer 9 is laminated to the surface of the sharkskin pattern to a thickness of usually 3–50 μm. If necessary, the thickness of the lubricating resin layer 9 may be made either thicker or thinner than that defined as above.

The site at which the draining portions 3,3 come in contact with the window glass 12 generally varies when the window glass enters or leaves said site, hence it is desirable that the coating of lubricating resin and, if necessary, the formation of sharkskin pattern be made so as to cover a relatively broad space of the draining portions 3,3.

In the glass run channel shown in FIG. 1, there is indicated a portion 16 in side said channel, against which the end of the window glass is hit, and this portion 16 may also be coated on its surface with the lubricating resin layer 9 consisting of the ultra-high molecular weight polyolefin (B) or the like.

EFFECT OF THE INVENTION

The first to fourth thermoplastic elastomer laminates of the present invention are excellent respectively in interlaminar bonding properties between the thermoplastic elastomer (A) layer and ultra-high molecular weight polyolefin (B) layer, between the thermoplastic elastomer (A) layer and ultra-high molecular weight polyolefin composition (C) layer, between the graft-modified thermoplastic elastomer (GA) layer and ultra-high molecular weight polyolefin (B) layer and between the graft-modified thermoplastic elastomer (GA) layer and ultra-high molecular weight polyolefin composition (C) layer.

The first to fourth thermoplastic elastomer laminates of the invention are light in weight in comparison with composite materials consisting of vulcanized rubber, or nylon fiber or non-rigid PVC, are free from surface tackiness caused by exudation of plasticizers or the like and, moreover, excellent in mechanical strength, heat resistance, heat aging characteristics, weathering resistance, abrasion resistance, scratch resistance, sliding properties and dimentional stability.

The first to fourth thermoplastic elastomer laminates of the invention are excellent in economical efficiency, because they can be prepared by a simplified process in comparison with the case of the conventional composite materials as mentioned above. In particular, the thermoplastic elastomer laminates having the ultra high molecular weight polyolefin composition (C) layer are excellent in economical efficiency more than the thermoplastic elastomer laminate having the ultra-high molecular weight polyolefin (B) layer, because the former (laminate) can be prepared by co-extrusion laminating the thermoplastic elastomer (A) with the ultra-high molecular polyolefin composition (C), or by co-extrusion laminating the graft-modified thermoplastic elastomer (GA) with the ultra-high molecular weight polyolefin composition (C).

The first to fourth thermoplastic elastomer laminates of the invention have such effects as mentioned above and can be used not only for applications in interior automotive trim or sealing materials (particularly glass run channel or belt line mole for which sliding properties with glass are required) but also for applications in furniture, construction materials, housings for appliances, bags, suit cases, sports goods, office supplies, sundries, etc.

The glass run channels of the invention are excellent in durability, intimate contacting properties with the window glass when it is closed, and in light sliding properties at the time of open-close operation, because the aforesaid thermoplastic elastomer laminates are used in the contacting portion with the window glass of the glass run channel.

The glass channels of the invention are also excellent in economical efficiency, because there can be omitted all the steps of coating an adhesive, curing or baking the coated adhesive and of embossing treatment before or after the above-mentioned steps, with the result that the number of processes to be employed can be reduced and the operating time required can be shortened.

The present invention is illustrated below with reference to examples, but it should be construed that the invention is in no way limited to those examples.

EXAMPLES AND COMPARATIVE EXAMPLE OF LAMINATE

EXAMPLE 1

A mixture of 80 parts by weight of an ethylene/propylene/ethylidene norbornene copolymer rubber having an ethylene content of 70 mol %, an iodine value of 12 and a Mooney viscosity $ML_{1+4}$ (100° C.) of 120 (herein after abbreviated to "EPDM (1)") and 20 parts by weight of polypropylene having MFR (ASTM D 1238-65T, 230° C.) of 13 and a density of 0.91 g/cm³ was kneaded in a Banbury mixer in a nitrogen atmosphere at 180° C. for 5 minutes. The kneaded product was rolled to obtain a sheet-like product which was then formed into square pellets by means of a sheet cutter.

Then, to the thus obtained square pellets, 0.3 part by weight of 1,3-bis(tert-butylperoxyisopropyl) benzene (hereinafter abbreviated to "Peroxide (A)") and 0.5 part by weight of divinyl benzene (hereinafter abbreviated to "DVB") were added and mixed in a Henschel mixer.

The resultant mixture was then extruded using a single screw extruder having L/D=30 and a screw diameter of 50 mm in a nitrogen atmosphere at 220° C., to thereby obtain a thermoplastic elastomer (a).

The gel content of the copolymer rubber in the thermoplastic elastomer (a) was measured by the method mentioned above. The result obtained is shown in Table 1.

Further, the thermoplastic elastomer (a) was compression-molded at 190° C. to prepare a test sheet, on which the physical properties of tensile stress at break (TB), flexibility and moldability were tested according to the following methods.

TEST METHOD (1) Tensile stress at break ($T_B$)

In accordance with JIS K 6301, the tensile stress at break ($T_B$: unit kgf/cm²) was measured at a stress rate of 200 mm/min.

(2) Flexibility

The flexibility was evaluated on the torsional rigidity (unit kgf/cm²) which was measured in accordance with ASTM D 1043.

(3) Moldability

The moldability was evaluated on the melt flow rate (MFR: unit g/10 min, 230° C., 2.16 kg) which was measured in accordance with ASTM D 1238.

The thermoplastic elastomer (a) was extruded in the form of a sheet by means of a T-die extruder of 50 mm diameter (manufactured and sold by Toshiba Machine Co., Ltd.) having a full-flighted screw and a coathanger type T-die under the conditions of L/D=28, 240° C. of an extrusion temperature and 2.5 m/min of a take-up speed. The extruded sheet-like thermoplastic elastomer (a) in a molten state was laminated on an ultra-high molecular weight polyolefin film (trade name: Skired Film of 0.1 mm thickness, produced by Sakushin Kogyo K.K.). The laminated material was passed through a pair of rolls in the manner such that the elastomer (a) and the ultra-high molecular weight polyolefin came in contact with the roll at 60° C. and the roll at room temperature, respectively.

Thus, there was obtained a laminate comprising the thermoplastic elastomer (a) layer of 1.0 mm thickness and the ultra-high molecular weight polyolefin layer of 0.1 mm thickness.

The interlaminar bonding strength of the obtained laminate was measured according to the following conditions.

Interlaminar bonding strength test
Test method: Peeling at 180°
Test specimen: 25 mm in width and 100 mm in length
Stress rate: 25 mm/min
Interlaminar bonding strength (unit kgf/cm) is obtained by dividing the peeling load by the width of the specimen.

The results are shown in Table 1.

EXAMPLE 2

A thermoplastic elastomer (b) was prepared in the same manner as in Example 1 except that Peroxide (A) and DVB were not used. Using the thermoplastic elastomer (b), a laminate was produced in the same manner as in Example 1. The results are shown in Table 1.

EXAMPLE 3

A thermoplastic elastomer (c) was prepared in the same manner as in Example 1 except that 10 parts by weight of a butyl rubber IIR-065 (degree of unsaturation: 0.8 mol %, produced by Esso, hereinafter abbreviated to "IIR (1)") and 30 parts by weight of a paraffinic process oil (trade name DIANA PROCESS OIL produced by IDEMITSU KOSANN) were used in addition to EPDM (1) and PP (1). Using the thermoplastic elastomer (c), a laminate was produced in the same manner as in Example 1. The results are shown in Table 1.

EXAMPLE 4

64 parts by weight of ethylene/propylene/ethylidene norbornene copolymer rubber having an ethylene content of 78 mol %, an iodine value of 13 and a Mooney viscosity ML1+4 (100° C.) of 75 (hereinafter abbreviated to "EDPM (2)") which was extended with 40 PHR of paraffinic process oil, 14 parts by weight of polypropylene having MFR (ASTM D 1238-65T, 230° C.) of 11 and a density of 0.91 g/cm³ (hereinafter abbreviated to "PP (2)"), 14 parts by weight of butyl rubber having a Mooney viscosity ML1+4 (100° C.) of 45 and a degree of unsaturation of 1.0 mol % (hereinafter abbreviated to "IIR (2)"), and 8 parts by weight of paraffinic process oil were kneaded in a Banbury mixer in a nitrogen atmosphere at 180° C. for 5 minutes. The kneaded product was rolled to obtain a sheet-like product which was formed into square pellets by means of a sheet cutter.

Then, the thus obtained square pellets, and a suspension of 0.4 parts by weight of Peroxide (A) in 0.4 parts by weight of DVB were mixed in a tumbler mixer to coat the square pellets with the suspension.

The resultant coated pellets were then extruded using an extruder in a nitrogen atmosphere at 210° C., to thereby obtain a thermoplastic elastomer (d).

Then, using the thermoplastic elastomer (d), a laminate was produced in the same manner as in Example 1. The physical properties were measured in the same manner as in Example 1. The results are shown in Table 1.

TABLE 1

| | Properties of thermoplastic elastomer Flexibility Moldability | | | | Property of laminate Interlaminar |
| --- | --- | --- | --- | --- | --- |
| | $T_B$ [kgf/cm²] | Torsional rigidity [kgf/cm²] | MFR [g/10 min] | Gel content [%] | bonding strength [kgf/cm] |
| Ex. 1 | 85 | 70 | 0.5 | 84 | broken |
| Ex. 2 | 87 | 67 | 0.4 | — | broken |
| Ex. 3 | 75 | 55 | 3.0 | 70 | broken |
| Ex. 4 | 50 | 20 | 0.5 | 57 | broken |

Note: "broken" means that the substrate is broken.

EXAMPLE 5

The thermoplastic elastomer (a) of Example 1 was extrusion molded at 230° C., and at the same time an ultra-high molecular weight polyethylene composition having an intrinsic viscosity [η], measured in decalin at 135° C., of 7.0 dl/g and a density of 0.965 g/cm³ consisting of 23 parts by weight of ultra-high molecular weight polyethylene having an intrinsic viscosity [η], measured in decalin at 135° C., of 28 dl/g and 77 parts by weight of low molecular weight polyethylene having an intrinsic viscosity [η], measured in decalin at 135° C., of 0.73 dl/g was co-extruded on the surface of the thermoplastic elastomer (a).

Thus, there was obtained a laminate comprising the thermoplastic elastomer (a) layer of 1.0 mm thickness and the ultra-high molecular weight polyethylene composition layer of 0.1 mm thickness.

The interlaminar bonding strength of the thus produced laminate was measured in the same manner as mentioned above. The result is shown in Table 2.

EXAMPLE 6

A laminate was produced in the same manner as in Example 5 except that the thermoplastic elastomer (b) of Example 2 was used instead of the thermoplastic elastomer (a). The physical properties were measured in the same manner as mentioned above. The results are shown in Table 2.

EXAMPLE 7

A laminate was produced in the same manner as in Example except that the thermoplastic elastomer (c) of Example 3 was used instead of the thermoplastic elastomer (a). The physical properties were measured in the same manner as described above. The results are shown in Table 2.

EXAMPLE 8

A laminate was produced in the same manner as in Example 5 except that the thermoplastic elastomer (d) of Example 4 was used instead of the thermoplastic elastomer (a). The physical properties were measured in the same manner as described above. The results are shown in Table 2.

TABLE 2

| | Properties of thermoplastic elastomer Flexibility Moldability | | | | Property of laminate Interlaminar |
| --- | --- | --- | --- | --- | --- |
| | $T_B$ [kgf/cm²] | Torsional rigidity [kgf/cm²] | MFR [g/10 min] | Gel content [%] | bonding strength [kgf/cm] |
| Ex. 5 | 85 | 70 | 0.5 | 84 | broken |
| Ex. 6 | 87 | 67 | 0.4 | — | broken |
| Ex. 7 | 75 | 55 | 3.0 | 70 | broken |
| Ex. 8 | 50 | 20 | 0.5 | 57 | broken |

Note: "broken" means that the substrate is broken.

EXAMPLE 9

80 parts by weight of EPDM (1) and 20 parts by weight of PP (1) were kneaded in a Banbury mixer in a nitrogen atmosphere at 180° C. for 5 minutes. The kneaded product was rolled to obtain a sheet-like product which was formed into square pellets by means of a sheet cutter.

Then, to the thus obtained square pellets, 0.3 parts by weight of Peroxide (A) and 0.5 parts by weight of maleic anhydride (hereinafter abbreviated to "MAH") were added and mixed in a Henschel mixer.

The resultant mixture was then extruded using a single screw extruder having L/D=30 and a screw diameter of 50 mm in a nitrogen atmosphere at 220° C., to thereby obtain a graft-modified thermoplastic elastomer (e).

The gel content of the copolymer rubber in the graft-modified thermoplastic elastomer (e) was measured by the method mentioned above. The result obtained is shown in Table 3.

Further, the graft-modified thermoplastic elastomer (e) was compression-molded at 190° C. to prepare a test sheet, on which the physical properties of tensile stress at break (TB), flexibility and moldability were tested by the methods mentioned above. The results are shown in Table 3.

The graft-modified thermoplastic elastomer (e) was extruded in the form of a sheet by means of T-die extruder of 50 mm diameter (manufactured and sold by Toshiba Machine Co., Ltd.) having a full-flighted screw and a coathanger type T-die under the conditions of L/D=28, 240° C. of an extrusion temperature and 2.5 m/min of a take-up speed. The sheet-like graft-modified thermoplastic elastomer (e) extruded in a molten state was laminated on a film of 0.1 mm thickness of ultrahigh molecular weight polyethylene having an intrinsic viscosity [$\eta$], measured in decalin at 135° C., of 15 dl/g. The laminated material was passed through a pair of rolls in such manner that the graft-modified thermoplastic elastomer (e) and the ultra-high molecular weight polyethylene film came in contact with the roll at 60° C. and the roll at room temperature, respectively.

The interlaminar bonding strength of the thus obtained laminate was measured in the same manner as mentioned above. The result is shown in Table 3.

Further, the dynamic coefficient of friction of the surface of the ultra-high molecular weight polyethylene film was measured in the following conditions.

Measurement of the dynamic coefficient of friction:
It is measured using Matsubara type abrasion tester at stepwise.
Abrasion roll material: SUS 304 (degree of roughness of about 6s)
Circumferential speed: 12 m/min
Load: 10 kg
Contact area: 2 cm$^2$

EXAMPLE 10

A graft-modified thermoplastic elastomer (f) was prepared in the same manner as in Example 9 except that Peroxide (A) and MAH were used in amounts 0.6 parts by weight and 2.0 parts by weight, respectively. Then, using the graft-modified thermoplastic elastomer (f), a laminate was produced in the same manner as in Example 9. The physical properties were measured mentioned above. The results are shown in Table 3.

EXAMPLE 11

A graft-modified thermoplastic elastomer (g) was prepared in the same manner as in Example 9 except that 10 parts by weight of IIR (1) and 30 parts by weight of the paraffinic process oil mentioned above were used in addition to EPDM (1) and PP (1). Then, using the graft-modified thermoplastic elastomer (g), a laminate was produced in the same manner as in Example 9. The physical properties were measured as mentioned above. The results are shown in Table 3.

EXAMPLE 12

A graft-modified thermoplastic elastomer (h) was prepared in the same manner as in Example 11 except that 0.5 parts by weight of glycidyl methacrylate was used instead of 0.5 parts by weight of MAH. Then, using the graft-modified thermoplastic elastomer (h), a laminate was produced in the same manner as in Example 11. The physical properties were measured as mentioned above. The results are shown in Table 3.

EXAMPLE 13

A graft-modified thermoplastic elastomer (i) was prepared in the same manner as in Example 11 except that EPDM (1), PP (1), IIR (1) and the paraffinic process oil were used in amounts of 60 parts by weight, 40 parts by weight, 20 parts by weight and 40 parts by weight, respectively. Then, using the graft-modified thermoplastic elastomer (i), a laminate was produced in the same manner as in Example 11. The physical properties were measured as mentioned above. The results are shown in Table 3.

EXAMPLE 14

A graft-modified thermoplastic elastomer (j) was prepared in the same manner as in Example 11 except that EPDM (1), PP (1), IIR (1) and the paraffinic process oil were used in amounts of 90 parts by weight, 10 parts by weight, 20 parts by weight and 40 parts by weight, respectively, and 3 parts by weight of glycidyl methacrylate was used instead of 0.5 parts by weight of MAH. Using the thus prepared thermoplastic elastomer (j), a laminate was produced in the same manner as in Example 11. The physical properties measured as mentioned above. The results are shown in Table 3.

EXAMPLE 15

A graft-modified thermoplastic elastomer (k) was prepared in the same manner as in Example 11 except that EPDM (1), PP (1), IIR (1), the paraffinic process oil and MAH were used in amounts of 70 parts by weight, 30 parts by weight, 40 parts by weight, 60 parts by weight, and 6 parts by weight, respectively. Using the thus prepared thermoplastic elastomer (k), a laminate was produced in the same manner as in Example 11. The physical properties measured as mentioned above. The results are shown in Table 3.

EXAMPLE 16

A laminate was produced in the same manner as in Example 9 except that the graft-modified thermoplastic elastomer (e) was extruded at 230° C., and at the same time an ultra-high molecular weight polyethylene composition having an intrinsic viscosity [$\eta$], as measured in decalin at 135° C., of 5.5 dl/g and a density of 0.955 g/cm$^3$ consisting of 23% by weight of ultra-high molecular weight polyethylene having an intrinsic viscosity [$\eta$], as measured in decalin at 135° C., of 30 dl/g and 77% by weight of low molecular weight polyethylene was co-extruded at 250° C. on the surface of the graft-modified thermoplastic elastomer (e). Thus, there was obtained a laminate comprising the thermoplastic elastomer (e) layer of 1.0 mm thickness and the ultra-high molecular weight polyethylene composition layer of 0.1 mm thickness. The dynamic coefficient of friction of the ultra-high molecular weight polyethylene composition layer in the laminate was 0.15. The results are shown in Table 3.

COMPARATIVE EXAMPLE 1

Substantially the same procedure as in Example 9 was conducted except that a polyamide sheet of 0.1 mm thickness (Trade name: Nylon 6, manufactured by Toray Co., Ltd.) was used instead of the ultra-high molecular weight polyethylene film, to thereby obtain a laminate comprising the graft-modified thermoplastic elastomer (e) layer of 1.0 mm thickness and the polyamide layer of 0.1 mm thickness. The dynamic coefficient of friction of the surface of the polyamide layer was 0.8. The results are shown in Table 3.

TABLE 3

| | Properties of thermoplastic elastomer Flexibility Moldability | | | | Property of laminate Interlaminar |
|---|---|---|---|---|---|
| | $T_B$ [kgf/cm$^2$] | Torsional rigidity [kgf/cm$^2$] | MFR [g/10 min] | Gel content [%] | bonding strength [kgf/cm] |
| Ex. 9 | 85 | 70 | 0.5 | 80 | broken |
| Ex. 10 | 87 | 70 | 0.2 | 87 | broken |
| Ex. 11 | 75 | 55 | 3.0 | 70 | broken |
| Ex. 12 | 78 | 56 | 3.0 | 74 | broken |
| Ex. 13 | 110 | 350 | 27 | 55 | 7.0 |
| Ex. 14 | 57 | 35 | 18 | 56 | broken |
| Ex. 15 | 87 | 73 | 35 | 46 | broken |
| Ex. 16 | 85 | 70 | 0.5 | 80 | broken |
| Comp. Ex. 1 | 85 | 70 | 0.5 | 80 | broken |

Note: "broken" means that the substrate is broken.

EXAMPLES OF GLASS RUN CHANNELS

EXAMPLE 17

75 parts by weight of ethylene/propylene/5-ethylidene-2-norbornene copolymer rubber having an ethylene content of 70 mol %, an iodine value of 12 and a Mooney viscosity $ML_{1+4}$ (100° C.) of 120 and 25 parts by weight of PP (1) were kneaded in a Banbury mixer in a nitrogen atmosphere at 180° C. for 5 minutes. Then, the kneaded product was rolled to obtain a sheet-like product which was then formed into square pellets by means of a sheet cutter.

To the thus obtained square pellets, 0.5 part by weight of DVB and 0.3 part by weight of Peroxide (A) were added and stirred in a Henshel mixer.

Then, the resultant mixture was extruded using a single screw extruder having L/D=30 and a screw diameter of 50 mm in a nitrogen atmosphere at 220° C., to thereby obtain a thermoplastic elastomer (1).

The gel content of the thermoplastic elastomer (1) was 97% by weight measured by the above-mentioned method.

The thermoplastic elastomer (1) was extruded at 230° C. to form a glass run channel comprising a main body and draining portions, and at the same time a film of 0.1 mm thickness of ultra-high molecular weight polyethylene having an intrinsic viscosity [$\eta$], as measured in decalin at 135° C., of 15 dl/g, which was preheated at 90° C., was laminated on the surface of the glass run channel by heat-fusion bonding in the outlet of the mold to thereby obtain the glass run channel of the present invention.

The cross-section view of the obtained glass run channel was as shown in FIG. 1. The glass run channel had an approximately trapezoidal shape. The total length of the inclined portion and horizontal portion of the glass run channel 1, to be fastened to the window frame 13, was 1500 mm and the length of the vertical portion was 90 mm, as shown in FIG. 3. The outside width of the bottom portion of the main body 2 was 15 mm, the height of the outside of the side portion was 20 mm and the length of the draining portions 3 was 10 mm as shown in FIG. 1. The thickness of the ultra-high molecular weight polyethylene composition layer was 30 μm on an average.

The molding time of the glass run channel could be shortened by 0.2 min/m as compared to that of a conventional method, that is, the molding time was decreased to 60% of the molding time of the conventional method.

The obtained glass run channel was fastened to a test window frame and a window glass of 3.2 mm thickness was provided therein. The durability test of the glass run channel was effected in the manner such that the window glass was repeatedly opened and closed. As a result, it was found that the glass run channel had an excellent durability without injuring the function as the glass run channel after repeating 50,000 times open-close operation. On the other hand, the conventional glass run channel having a laminate structure such that the window glass sliding portion was made by bonding a nylon film to a non-rigid polyvinyl chloride resin layer was worn out at the contact surface with the window glass after repeating 25,000 times open-close operation, that is, the frictional resistance was extremely increased therebetween, and therefore such conventional glass run channel could not be used.

EXAMPLE 18

75 parts by weight of ethylene/propylene/ethylidene norbornene copolymer rubber of Example 17 and 25 parts by weight of PP (1) were kneaded in a Banbury mixer in a nitrogen atmosphere at 180° C. for 5 minutes. Then, the kneaded product was rolled to obtain a sheet-like product which was then formed into square pellets by means of a sheet cutter.

To the thus obtained square pellets, 0.5 part by weight of DVB and 0.3 part by weight of Peroxide (A) were added and stirred in a Henschel mixer.

Then, the resultant mixture was extruded using a single screw extruder having L/D=30 and a screw diameter of 50 mm in a nitrogen atmosphere at 220° C., to thereby obtain a graft-modified thermoplastic elastomer (m).

The gel content of the graft-modified thermoplastic elastomer (m) was 96% by weight measured by the above-mentioned method.

The graft-modified thermoplastic elastomer (m) was molded in the same manner as in Example 17, to thereby obtain a glass run channel. The molding time was decreased to 60% of the molding time of the conventional method. The durability test was effected in the same manner as in Example 17. As a result, it was found that the glass run channel of the present invention had an excellent durability after repeating 50,000 times open-close operation.

EXAMPLE 19

The thermoplastic elastomer (1) of Example 17 was extruded at 230° C. to form a glass run channel comprising a main body and draining portions, and at the same time a film of 0.1 mm thickness of ultra-high molecular weight polyethylene composition having an intrinsic viscosity [$\eta$], as measured in decalin at 135° C., of 7.0 dl/g and a density of 0.965 g/cm$^3$, which is consisting of 23% by weight of ultra-high molecular weight polyethylene having an intrinsic viscosity [$\eta$], as measured in decalin at 135° C., of 28 dl/g and 77% by weight of low-molecular weight polyethylene having an intrinsic viscosity [$\eta$], as measured in decalin at 135° C., of 0.73 dl/g was laminated on the surface of the glass run channel by co-extrusion, to thereby obtain the glass channel of the present invention.

The cross-section view of the obtained glass run channel was as shown in FIG. 1. The glass run channel had an approximately trapezoidal shape. The total length of the inclined portion and horizontal portion of the glass run channel 1, to be fastened to the window frame 13, was 1500 mm and the length of the vertical portion was 90 mm as shown in FIG. 3. The outside width of the bottom portion of the main body 2 was 15 mm, the outside height of the side portion was 20 mm and the length of the draining portion 3 was 10 mm as shown in FIG. 1. The thickness of the ultra-high molecular weight polyethylene composition layer was 30 μm on an average.

The molding time of the glass run channel could be shortened by 0.2 min/m as compared to that of a conventional method, that is, the molding time was decreased to 60% of the molding time of the conventional method.

The obtained glass run channel was fastened to a test window frame and a window glass of 3.2 μm thickness was provided therein. The durability test of the glass run channel was effected in the manner such that the window glass was repeatedly opened and closed. As a result, it was found that the glass run channel had an excellent durability without injuring the function as the glass run channel after repeating 50,000 times open-close operation. On the other hand, the conventional glass run channel having a laminate structure such that the window glass sliding portion was made by bonding a nylon film to a non-rigid polyvinyl chloride resin layer was worn out at the contact surface with the window after repeating 25,000 times open-close operation, that is the frictional resistance was extremely increased therebetween, and therefore such glass run channel could not be used.

EXAMPLE 20

An ultra-high molecular weight polyethylene composition was prepared in the same manner as in Example 19 except that instead of the ultra-high molecular weight polyethylene composition of Example 19, 100 parts by weight of this ultra-high molecular weight polyethylene composition and 2 parts by weight of ethylene/propylene copolymer synthetic oil having a number average molecular weight of 1300 and a dynamic friction of 100 cSt at 100° C., as a liquid lubricant, were stirred in a Henschel mixer and pelletized by a monoaxial extruder.

Then, using the thus prepared ultra-high molecular weight polyethylene composition, a glass run channel was produced in the same manner as in Example 19.

The molding time of the glass run channel was decreased to 60% of that of a conventional method. The glass run channel had an excellent durability without injuring the function as the glass run channel after repeating 50,000 times open-close operation.

EXAMPLE 21

A glass run channel was produced in the same manner as in Example 19 except that the graft-modified thermoplastic elastomer (m) of Example 18 was used instead of the thermoplastic elastomer (1).

The molding time of the glass run channel was decreased to 60% of that of a conventional method. The glass run channel had an excellent durability without injuring the function as the glass run channel after repeating 50,000 times open-close operation.

We claim:

1. A thermoplastic elastomer laminate which comprises
    a layer comprising a graft-modified thermoplastic elastomer (GA) and
    a layer comprising an ultra-high molecular weight polyolefin (B),
    said graft-modified thermoplastic elastomer (GA) being obtained by dynamic heat treatment and partial cross-linking of a blend in the presence of an organic peroxide,
    said blend containing
        (i) 95—10 parts by weight of a peroxide cross-linking olefin copolymer rubber,
        (ii) 5-90 parts by weight of a polyolefin (the sum total of the (i) and (ii) components is 100 parts by weight) and
        (iii) 0.01-10 parts by weight of an α,β-unsaturated carboxylic acid or its derivatives, or an unsaturated epoxy monomer.

2. The thermoplastic elastomer laminate according to claim 1 wherein the graft-modified thermoplastic elastomer (GA) further contains
    (iv) 5-100 parts by weight of a peroxide non-cross linking rubbery substance and/or
    (v) 3-100 parts by weight of a mineral oil softener based on 100 parts by weight of the sum total of the components (i) and (ii).

3. The thermoplastic elastomer laminate according to claim 2 wherein the content of said peroxide cross-linking olefin copolymer rubber (i) is 95—60 parts by weight and that of said polyolefin (ii) is 5-40 parts by weight (the sum total of the components (i) and (ii) is 100 parts by weight).

4. The thermoplastic elastomer laminate according to claim 1 wherein said ultra-high molecular weight polyolefin (B) has an intrinsic viscosity [η], as measured in decalin at 135° C., of 10-40 dl/g.

5. A thermoplastic elastomer laminates which comprises
    a layer comprising a graft-modified thermoplastic elastomer (GA) and
    a layer comprising an ultra-high molecular weight polyolefin composition (C),
    said graft-modified thermoplastic elastomer (GA) being obtained by dynamic heat treatment and partial cross-linking of a blend in the presence of an organic peroxide,
    said blend containing
        (i) 95—10 parts by weight of a peroxide cross-linking olefin copolymer rubber,
        (ii) 5-90 parts by weight of a polyolefin (the sum total of the (i) and (ii) components is 100 parts by weight) and
        (iii) 0.01-10 parts by weight of an α,β-unsaturated carboxylic acid or its derivatives, or an unsaturated epoxy monomer,
    said ultra-high molecular weight polyolefin composition (C) consisting essentially of an ultra-high molecular weight polyolefin having an intrinsic viscosity [η], as measured in decalin at 135° C., of 10-40 dl/g, and a polyolefin having an intrinsic viscosity [η], as measured in decalin at 135° C., of 1-5 dl/g,
    said ultra-high molecular weight polyolefin existing in a proportion of 15-40% by weight based on 100% by weight of the sum total of the ultra-high molecular weight polyolefin and polyolefin, and
    said ultra-high molecular weight polyolefin composition (C) having an intrinsic viscosity [η], as measured in decalin at 135° C., of 3.5-8.3 dl/g.

6. The thermoplastic elastomer laminate according to claim 5 wherein the graft-modified thermoplastic elastomer (GA) further contains
   (iv) 5-100 parts by weight of a peroxide non-cross linking rubbery substance and/or
   (v) 3-100 parts by weight of a mineral oil softener based on 100 parts by weight of the sum total of the components (i) and (ii).

7. The thermoplastic elastomer laminate according to claim 5 wherein the content of said peroxide cross-linking olefin copolymer rubber (i) is 95—60 parts by weight and that of said polyolefin (ii) is 5-40 parts by weight (the sum total of the components (i) and (ii) is 100 parts by weight).

8. The thermoplastic elastomer laminate according to claim 5 wherein said ultra-high molecular weight polyolefin composition (C) contains 1-20% by weight, based on the composition (C), of a liquid or solid lubricant.

* * * * *